UNITED STATES PATENT OFFICE.

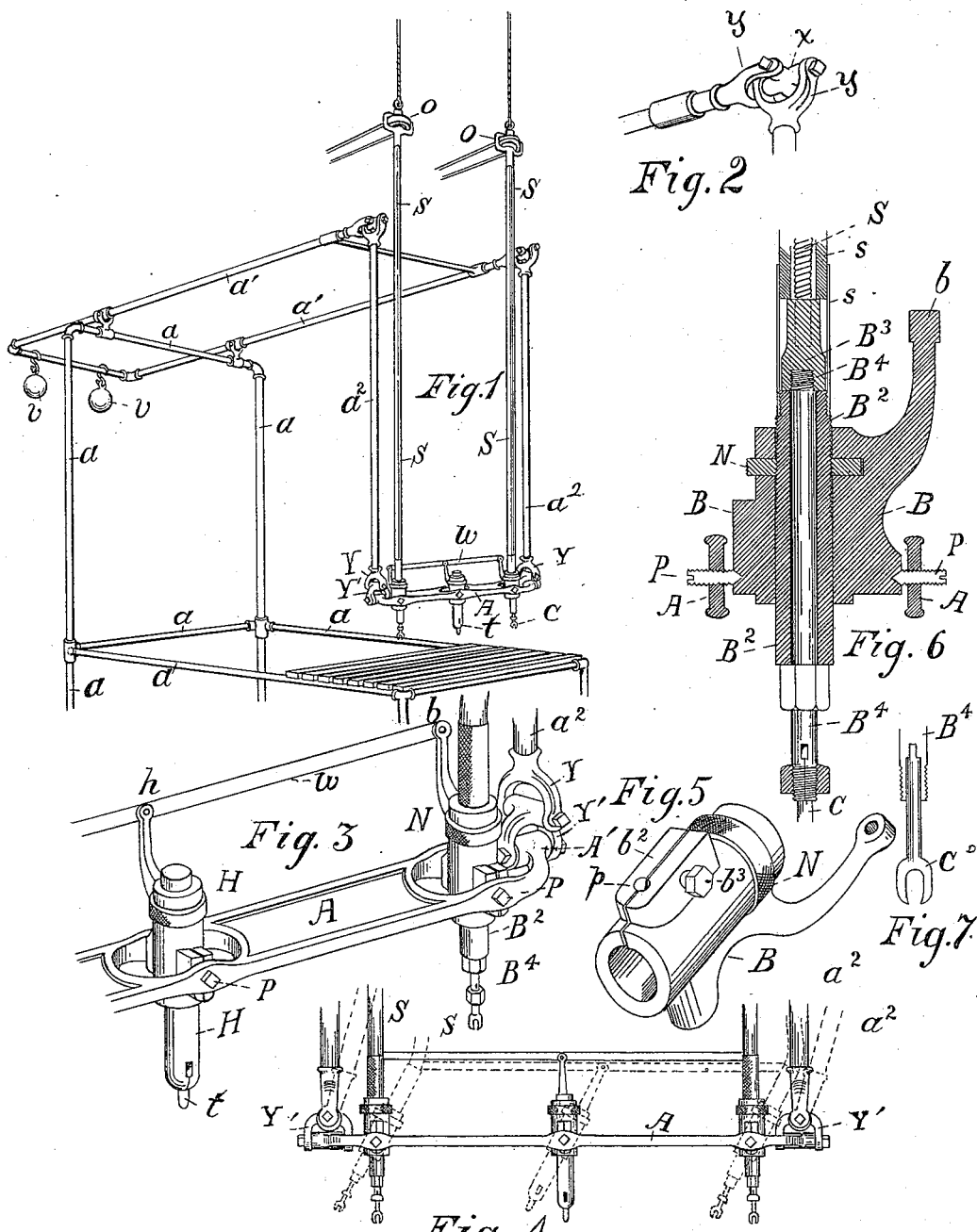

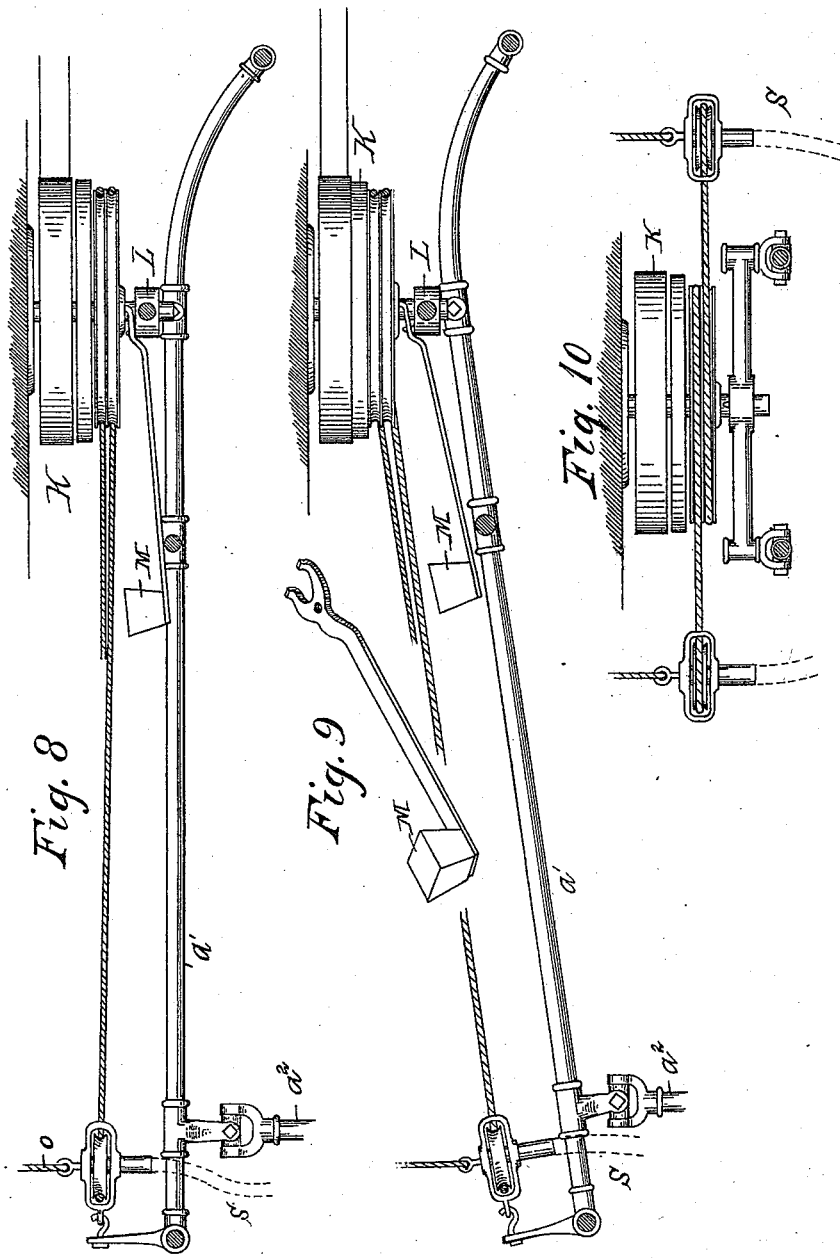

CLARENCE F. HOTCHKISS, OF BINGHAMTON, NEW YORK.

CARVING-MACHINE.

SPECIFICATION forming part of Letters Patent No. 441,087, dated November 18, 1890.

Application filed December 9, 1889. Serial No. 333,037. (No model.)

*To all whom it may concern:*

Be it known that I, CLARENCE F. HOTCHKISS, a citizen of the United States, residing at Binghamton, in the county of Broome and State of New York, have invented certain new and useful Improvements in Carving-Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Similar letters refer to similar parts throughout the several views.

My invention is that of a power carving-machine for wood-carving, designed more especially for furniture manufacturing, to take the place of the ornamental hand-carving heretofore required.

In the accompanying drawings, Figure 1 is a perspective of the upright machine, showing the frame, table, balance-weights, working-head, and the driving-shafts, with the pulleys on the shafts, but not the complete connections with the driving mechanism. Fig. 2 is a detail in perspective of the joint used in the various movements of the machine. Fig. 3 is a view in perspective of a part of the working-head of the machine, showing the hand-piece and one of the spindle-carriers, cutting-tool, and the working mechanism connected with the spindle-carrier, of which Fig. 6 is a section. Fig. 4 is an elevation in outline of the whole working-head of the carver, the dotted lines showing the position of tools and shafts when turned to cut in either direction under the surface of the wood. Fig. 5 is a perspective of the spindle-carrier through which the driving-shaft works and which carries the spindle in the head. Fig. 6 is a vertical section of one of the working-tool heads of the carver, showing the spindle-carrier, which is shown in perspective in Fig. 5, and the whole operative mechanism of the cutting part of the machine, also the connection with the driving-shaft. Fig. 7 is a sectional detail of the cutting-tool employed in ordinary work. Fig. 8 is a side view of the top of the machine when hung and pivoted to a band-wheel attached to the upper floor of the working-room, showing, also, the connection with the working-shafts of the carver. Fig. 9 shows the same mechanism when drawn down to work. Fig. 10 is a front view of the pulleys and driving-shafts, showing, also, the frame broken off where it rocks in the hanger.

I am aware that carving-machines have been made designed for the same uses and purposes as is the present invention. I do not wish to be understood as claiming as my invention carving by machinery; but my machine is intended to make the operation more certain and definite, and is capable of being used very easily and exactly.

The frame $a$ $a$ $a$ of the machine shown in the drawings is made of gas-pipe, fastened together in the ordinary methods, and any table may be placed on it which shall be adapted to the work. If a stiffer frame is required, it may be made of heavier material or braces added. It is not necessary that a sliding table be used, as the head of the machine has a forward and backward movement; but if a sliding table is considered more convenient it can be readily attached by any skilled mechanic.

Upon the top rail of the back frame of the machine are seated yokes carrying the rocking rods $a'$. These are designed to carry the working-head A of the machine, the weight of which is balanced by the hanging weights on the cross-bar at the rear of these rods $a'$. Near the front of these rods is another cross-bar to keep them at precisely the same distance apart. At the front ends of the rods is the joint, (shown in Fig. 2,) having the yokes Y Y joined by the cross X, which is countersunk in the ends of the arms to receive the screw-pivots which hold the yokes and upon which they swing. This cross X must be fitted up with arms of equal length and at right angles to each other to secure uniformity of motion in both directions, as it is necessary to the correct working of the machine that these joints shall work exactly alike.

Threaded in the hanging yokes are the rods $a^2$ $a^2$, which carry the working-head A. Care must be taken that these also are exactly of the same length to secure the best results. Attached to the lower end of each of these rods $a^3$ is the yoke Y, of the same construction as the ones at the upper joint. Hung in this is another yoke Y' to secure the necessary swing endwise of the head. This second yoke Y' is pivotally attached to the end of the head A at the barrel A' at its end. This attachment is best made by drilling directly through the barrel A', then driving through a steel rod countersunk at each end, in which countersink the pivot ends work. By means of this lower joint a rolling movement may be given to the head A when required.

The construction of the head A is shown most clearly in Fig. 3, in which one end is broken away at the left of the hand-piece H. It has a large aperture at each end to receive the spindle-carriers B, which carry the working mechanism of the machine. In the middle a like aperture receives the hand-piece H, which carries the tracer $t$ for following the design in the pattern.

The working mechanism of the machine is contained in the spindle-carrier B, one of which is hung in each end of the head A. These spindle-carriers and the working-tools may be duplicated by making the head A longer and adding a greater number of the spindles. It is necessary, however, that they be made in pairs in order to retain the balance of the head. The body of the spindle-carrier is not made solid, but is slitted through one side for its entire length, except the part above the milled nut N, as shown in Fig. 5. On the slitted side it has the projection $b^2$. (Shown definitely in Fig. 5.) These projections are drawn together by the small screw $b^3$, so that the sleeve holding the spindles may be firmly held after being adjusted to the proper height, as it is necessary to the proper working of the machine that there shall be no waste motion in any direction.

Through the central orifice of the spindle-carrier is a sleeve $B^2$, made preferably of brass, fitted closely in the spindle-carrier. Near the upper end this sleeve is screw-threaded on its outer surface and passed through the milled nut N for adjusting the height of the sleeve in the spindle-carrier. The sleeve is surmounted by the cap $B^3$, fitting down upon the top of it, but not attached to it. At its upper end this cap $B^3$ receives the flexible shaft S, fitted and firmly attached within it, so that the cap $B^3$ revolves with the shaft. At the lower end of this cap $B^3$ is a screw-threaded orifice, which receives the spindle $B^4$, which is passed up through the sleeve $B^2$. At the lower end of the sleeve the spindle has a check-nut (shown in Fig. 6) fitted up closely against the lower end of the sleeve. The lower end of this spindle $B^4$ is slitted and perforated to receive the cutting-tool C, and has the ordinary check-nut to hold the tool in place. The spindle is screwed up firmly in the cap $B^3$, and any wear at either end may be taken up by taking out the spindle and turning off the upper end where it enters the cap.

The driving-shafts S S may be flexible shafts, (known as the "Stowe flexible shaft,") working within the casing $s$, a section of the shaft being shown at the top of Fig. 6. These shafts are driven by the pulleys O O, (shown in Fig. 1,) the belts on them being driven by any grooved pulley in the ordinary form.

The spindle-carriers B B and the hand-piece H are hung in the head A on pivot-pins P, which enter the orifice $p$ (shown in Fig. 5) and the corresponding one in the back, all of which is shown in Fig. 6, where the pins P are shown passing through the sides of the head A. By means of the arms $b$, extending upward from the spindle-carriers, and the arm $h$, extending up from the hand-piece H, the hand-piece and spindle-carrier are connected together by the transverse bar W. The hand-piece and spindle-carriers will thus receive the same transverse motion at all times, occupying always precisely the same relative position transversely, and are always in the same direction relatively to the table.

The pivots P P should have check-nuts on them in order that they may always hold firmly. Then if they are kept tight, holding both hand-piece and spindle-carriers firmly in the head A, any movement of the hand-piece is imparted in like measure to the spindle-carriers and the cutting-tool C.

The operation of the machine is as follows: The pattern containing the desired carving is made fast on the center of the table and a block of like size under each of the cutting-tools C. The operator, holding the hand-piece H in his hand, brings the head of the machine down until the tracer $t$ comes upon the pattern, when this tracer is guided by the hand upon the pattern, and the cutters C C, being rotated rapidly by the shaft, cut the blocks to the same design as the pattern which the tracer $t$ is following. The frame carrying the head is to be so balanced as to be easily raised and lowered, as required, by the operator, and a small amount of experience will enable the workman to feed proportionately, as the cutters will easily remove the wood. Any other form of cutting-knife may be substituted for the cutter C shown in the drawings.

The flexible shafts S S need to be long enough to admit of turning the head in any direction required, and are adjusted by means of hangers above the pulleys O O. These hangers should be rope or other flexible material to allow the shafts to work easily when the position of the head is changed, and the draw of the belts upon them may be counteracted by weights hung over pulleys, if desirable.

Figs. 8, 9, and 10 show the frame hung and pivoted at L upon the lower end of a spindle fastened to the frame of the building. The hanger carries above the pivot-point the driving-wheel K for driving the mechanism of the carver. The carrying-rods $a'$ are substantially the same as those shown in Fig. 1, and carry the head-piece by means of the perpendicular rods $a^2$ in the same way, the frame being balanced by weights at the rear end, the same as in Fig. 1, and the driving-shaft S S being geared in the same way. The band-stretcher M is used in this form of construction to keep the belt from running off the driver K when the frame is drawn down, as shown in Fig. 9.

I do not wish to limit myself to any particular form of frame or hanging for the machine; but in whatever form the frame should be made or the machine hung it is necessary that the carrying-rods $a^2$ shall work evenly together.

Having thus described my invention and the method of its construction, what I claim as new, and desire to secure by Letters Patent, is—

1. In a carving-machine, a spindle-carrier pivoted in a head having a central orifice vertically through it, in which is a sleeve fitted closely within it, the vertical position of said sleeve in the spindle-carrier being adjusted by a nut, and a spindle working through the sleeve, said spindle being attached at its upper end to a shaft and carrying a cutting-tool at its lower end.

2. A spindle-carrier having a vertical orifice, a threaded sleeve fitted closely therein, and a nut located partially within said spindle-carrier, in combination with a spindle passing through said sleeve and supporting at its lower end a cutting-tool and itself supported from its upper end.

3. A spindle-carrier having a central vertical orifice, a threaded sleeve fitted closely therein, a nut located partially within said spindle-carrier and engaging said threaded sleeve for adjusting the same, a cap in contact with the upper end of said sleeve, and a spindle passing through said sleeve and secured at its upper end to said cap, in combination with a shaft connected with said cap, and a cutting-tool carried by said spindle.

4. In a carving-machine, the combination, with a head for supporting the carving devices, of barrels at the ends of said head, vertical rods suspending said head, said rods having yokes at their lower ends, and yokes pivotally connected to said first-mentioned yokes and to said barrels.

5. In a carving-machine, the combination of a head for supporting the tracing and carving devices, barrels at the ends of said head, vertical rods suspending said head, yokes at the lower ends of said rods, yokes pivotally connected to said first-mentioned yokes and to said barrels, and rocking rods, to the forward extremities of which said vertical rods are articulated.

6. In a carving-machine, a supporting-frame, weighted rocking rods pivoted thereto and having yokes at their forward ends, vertical rods for suspending the carving devices, said vertical rods having yokes at their upper ends arranged at an angle to the yokes of said rocking rods, and hollow crosses arranged between said yokes of the vertical and rocking rods and pivotally connected therewith, as described, in combination with yokes at the lower ends of said vertical rods, a head having barrels at its ends, and yokes pivotally connecting the yokes at the lower ends of the vertical rods with said barrels.

In testimony whereof I hereto affix my signature in presence of two witnesses.

CLARENCE F. HOTCHKISS.

Witnesses:
 FREMONT F. WILLIAMS,
 NETTIE HILTS.